US011624039B1

(12) United States Patent
McCarthy

(10) Patent No.: US 11,624,039 B1
(45) Date of Patent: Apr. 11, 2023

(54) APPARATUS AND METHOD FOR COLLECTION AND DISPOSAL OF FATS, OIL AND GREASE

(71) Applicant: Martin Franklin McCarthy, Charlotte, NC (US)

(72) Inventor: Martin Franklin McCarthy, Charlotte, NC (US)

(73) Assignee: Martin Franklin McCarthy, Charlotte, NC (US)

( * ) Notice: Subject to any disclaimer, the term of this patent is extended or adjusted under 35 U.S.C. 154(b) by 0 days.

(21) Appl. No.: 18/081,290

(22) Filed: Dec. 14, 2022

Related U.S. Application Data

(63) Continuation of application No. 17/685,585, filed on Mar. 3, 2022, now Pat. No. 11,535,812, which is a
(Continued)

(51) Int. Cl.
*C11B 13/04* (2006.01)
*B01D 17/02* (2006.01)
(Continued)

(52) U.S. Cl.
CPC .......... *C11B 13/04* (2013.01); *B01D 17/0202* (2013.01); *B01D 39/083* (2013.01); *B01J 20/24* (2013.01); *B01J 20/261* (2013.01); *C02F 1/286* (2013.01); *C02F 1/40* (2013.01); *E03F 5/16* (2013.01); *B01D 2239/0266* (2013.01);
(Continued)

(58) Field of Classification Search
CPC ... C11B 13/04; B01D 17/0202; B01D 39/083; B01D 2239/0266; B01D 2239/0407; B01J 20/24; B01J 20/261; C02F 1/286; C02F 1/40; C02F 2101/32; C02F 2103/32; C02F 2103/44; E03F 5/16
See application file for complete search history.

(56) References Cited

U.S. PATENT DOCUMENTS 3,678,662 A  7/1972  Grote
3,862,963 A  1/1975  Hoshi et al.
(Continued)

FOREIGN PATENT DOCUMENTS

CA   2777850 A1   11/2013
CA   2931443 A1   11/2017
(Continued)

OTHER PUBLICATIONS

International Search Report (ISR) and Written Opinion (WO) for PCT/EP/2022/021203 dated Jul. 21, 2022 (13 pages.).
(Continued)

*Primary Examiner* — Liam Royce
(74) *Attorney, Agent, or Firm* — Shumaker, Loop & Kendrick, LLP

(57) ABSTRACT

An apparatus for collection and disposal of fats, oil and grease that includes a fabric container having at least one open end, a biogradable material capable of absorbing a large quantity of fats, oil and grease positioned in the container through the open end, the container and biogradable material adapted for being placed in a source of fats, oil and/or grease for absorbing the Pats, oil and/or grease for removal from the source and for transport to a location for processing.

21 Claims, 5 Drawing Sheets

Related U.S. Application Data continuation-in-part of application No. 17/362,168, filed on Jun. 29, 2021, now Pat. No. 11,529,571.

(60) Provisional application No. 63/164,761, filed on Mar. 23, 2021.

(51) Int. Cl.
  B01D 39/08 (2006.01)
  C02F 1/28 (2023.01)
  C02F 1/40 (2023.01)
  B01J 20/24 (2006.01)
  B01J 20/26 (2006.01)
  E03F 5/16 (2006.01)
  C02F 101/32 (2006.01)
  C02F 103/44 (2006.01)
  C02F 103/32 (2006.01)

(52) U.S. Cl.
  CPC .. *B01D 2239/0407* (2013.01); *C02F 2101/32* (2013.01); *C02F 2103/32* (2013.01); *C02F 2103/44* (2013.01)

(56) References Cited

U.S. PATENT DOCUMENTS

| | | | |
|---|---|---|---|
| 4,378,229 | A | 3/1983 | Leen |
| 4,925,343 | A | 5/1990 | Raible et al. |
| 5,264,134 | A | 11/1993 | McCamy |
| 5,744,406 | A | 4/1998 | Novak |
| 6,010,558 | A | 1/2000 | Ackland |
| 6,365,214 | B1 | 4/2002 | Kirk |
| 6,508,849 | B1 | 1/2003 | Comas |
| 6,517,709 | B1 | 2/2003 | Cardwell et al. |
| 6,818,027 | B2 | 11/2004 | Murcia |
| 7,354,516 | B1 | 4/2008 | Young et al. |
| 7,597,727 | B1 | 10/2009 | Morris |
| 10,066,178 | B2 | 9/2018 | Tanel |
| 10,882,758 | B2 | 1/2021 | Sands |
| 11,339,341 | B1 | 5/2022 | McCarthy |
| 11,529,571 | B2 | 12/2022 | McCarthy |
| 11,535,804 | B2 | 12/2022 | McCarthy |
| 11,535,805 | B2 | 12/2022 | McCarthy |
| 11,535,812 | B2 | 12/2022 | McCarthy |
| 2001/0023007 | A1 | 9/2001 | Leriget |
| 2003/0079400 | A1 | 5/2003 | Weissman et al. |
| 2003/0121802 | A1 | 7/2003 | MacQuoid |
| 2004/0035046 | A1 | 2/2004 | Weissman et al. |
| 2004/0161606 | A1 | 8/2004 | Bilkey |
| 2005/0268542 | A1 | 12/2005 | Weissman et al. |
| 2006/0000767 | A1 | 1/2006 | Trauger et al. |
| 2006/0156621 | A1 | 7/2006 | Kraus et al. |
| 2006/0230673 | A1 | 10/2006 | Barford et al. |
| 2007/0029247 | A1* | 2/2007 | Alpert ................ B01D 17/045 210/287 |
| 2007/0169409 | A1 | 7/2007 | Chang |
| 2009/0014087 | A1 | 1/2009 | Fevag |
| 2009/0200241 | A1 | 8/2009 | Harman et al. |
| 2011/0000854 | A1 | 1/2011 | Nichols et al. |
| 2012/0006761 | A1 | 1/2012 | Parker et al. |
| 2012/0251597 | A1 | 10/2012 | Gupta et al. |
| 2012/0311972 | A1 | 12/2012 | Hunter |
| 2013/0056369 | A1 | 3/2013 | Jorgensen |
| 2014/0087315 | A1 | 3/2014 | Doyle et al. |
| 2015/0322361 | A1 | 11/2015 | Creutzmann |
| 2017/0081251 | A1 | 3/2017 | Townsend |
| 2017/0226440 | A1 | 8/2017 | Fandrich et al. |
| 2019/0040593 | A1 | 2/2019 | Tetrault et al. |
| 2019/0176059 | A1* | 6/2019 | Zock ................ E02B 3/125 |
| 2021/0002571 | A1 | 1/2021 | Zeitler et al. |
| 2021/0070640 | A1 | 3/2021 | Yaman et al. |

FOREIGN PATENT DOCUMENTS

| | | |
|---|---|---|
| CN | 213253724 U | 5/2021 |
| DE | 102009013985 A1 | 9/2010 |
| DE | 102012104574 A1 | 12/2013 |
| DE | 202014001312 U1 | 3/2014 |
| DE | 202019003324 U1 | 8/2019 |
| EP | 2216387 A1 | 8/2010 |
| EP | 3750853 A1 | 12/2020 |
| FR | 2989384 A1 | 10/2013 |
| GB | 2389858 B | 1/2005 |
| KR | 10-1953361 B1 | 2/2019 |
| WO | 2008141752 A1 | 11/2008 |
| WO | 2012062324 A1 | 5/2012 |
| WO | 2013108223 A1 | 7/2013 |
| WO | 2014-068316 A1 | 5/2014 |
| WO | 2017152229 A1 | 9/2017 |
| WO | 2019145944 A1 | 8/2019 |

OTHER PUBLICATIONS

Mathavan, G.N. et al. 1989. Use of peat in the treatment of oily waters. Water, Air, and Soil Pollution 45: 17-26. (Year: 1989).
Pintor, A.M.A. 2016. Oil and grease removal from wastewaters. Sorption treatment as an alternative to state-of-the-art technologies. A critical review. Chemical Engineering Journal 297 (20216) 229-255 (Year: 2016).
Non-Final Office Action issued for U.S. Appl. No. 17/362,168, dated Jul. 20, 2022 (9 pages).
Non-Final Office Action issued for U.S. Appl. No. 17/736,601, dated Jul. 22, 2022 (17 pages).
Non-Final Office Action issued for U.S. Appl. No. 17/685,565, dated Aug. 17, 2022 (21 pages).
International Search Report (ISR) and Written Opinion (WO) for PCT/EP2022/021205 dated Jun. 8, 2022 (9 pages).
Olga et al., Cleanup of Water Surface from Oil Spills Using Natural Sorbent Materials, National Research Tomsk Polytechnic University, Procedia Chemistry 10 (2014), pp. 145-150.
City of Dothan Alabama, Fats, Oils and Grease (FOG) Science, dated Oct. 27, 2020, Retrieved from https:/www.dothan.org/DocumentCenterNiew/3032/FOG--Science?bidId, 7 pages.
Finney et al., 2009 "Fuel pelletization with a binder: part I—identification of a suitable binder for spent mushroom compost-coal tailing pellets". Energy & Fuels 23, 3195-3202. (Year: 2009).
Abomohra et al. 2020 "Potential of fat, oil and grease (FOG) for biodiesel production: A critical review on the recent progress and future perspectives" Progress in Energy and Combustion Science 81 (Year: 2020).
Notice of Allowance (NOA) issued for U.S. Appl. No. 17/362,168, dated Oct. 31, 2022 (10 pages).
Final Rejection issued for U.S. Appl. No. 17/685,565, dated Sep. 23, 2022 (8 pages).
Notice of Allowance (NOA) issued for U.S. Appl. No. 17/685,565, dated Oct. 31, 2022 (9 pages).
Corrected Notice of Allowance (NOA) issued for U.S. Appl. No. 17/685,565, dated Nov. 3, 2022 (9 pages).
Final Rejection issued for U.S. Appl. No. 17/736,601, dated Sep. 23, 2022 (9 pages).
Notice of Allowance (NOA) issued for U.S. Appl. No. 17/736,601, dated Oct. 31, 2022 ( 9 pages).
Non-Final Office Action issued for U.S. Appl. No. 17/685,585, dated Jul. 20, 2022 (11 pages).
Notice of Allowance (NOA) issued for U.S. Appl. No. 17/685,585, dated Nov. 2, 2022 (11 pages).
U.S. Non-Final Office Action for U.S. Appl. No. 18/081,295 dated Feb. 2, 2023 (24 pages).
U.S. Final Rejection for U.S. Appl. No. 18/081,295 dated Mar. 2, 2023 (15 pages).

* cited by examiner

APPARATUS AND METHOD FOR COLLECTION AND DISPOSAL OF FATS, OIL AND GREASE

TECHNICAL FIELD

The present invention relates to apparatuses and methods for collection and disposal of fats, oil and grease.

BACKGROUND

The National Pretreatment Program implements Clean Water Act requirements to control pollutants that are introduced into publically-owned treatment works ("POTWs"). As part of this program, EPA has promulgated General Pretreatment Regulations that require the establishment of State and local pretreatment programs to control pollutants, which pass through or interfere with POTW treatment processes or may contaminate POTW sewage sludge. Meeting these requirements may require elimination of interference caused by the discharge to POTWs of Fats, Oil, and Grease (FOG) from food service establishments (FSE). More specifically, the Pretreatment Program regulations at 40 CFR § 403.5(b)(3) prohibit "solid or viscous pollutants in amounts which will cause obstruction" in the POTW and its collection system. EPA's Report to Congress on combined sewer overflows (CSOs) and sanitary sewer overflows (SSOs) identified that "grease from restaurants, homes, and industrial sources are the most common cause (47%) of reported blockages. Grease is problematic because it solidifies, reduces conveyance capacity, and blocks flow."

Controlling FOG discharges will help POTWs prevent blockages that impact CSOs and SSOs, which cause public health and water quality problems.

FOG wastes are generated at food service establishments as byproducts from food preparation, and cleaning activities for pans, dishes, utensils and other surfaces. FOG captured on site is generally classified into two broad categories. The first type is yellow grease that is the byproduct of deep-frying, and often captured in large containers, then ultimately sold into the reuse market. The second type of FOG, focus of this application, are the fats, oil and grease that are washed down the sink and floor drains into the Grease Trap. These fats, oil and grease are a result of cleaning pans, plates, utensils and other grease-laden surfaces in the food service establishment. The annual production of grease trap waste is massive. Currently FOG that escapes the trap creates upwards of 40,000 sanitary sewer overflows per year. Food service establishments create volumes of FOG that run from 800 to 1,700 pounds per year.

Food service establishments can adopt a variety of best management practices or install interceptor/collector devices to control and capture the FOG material before discharge to the POTW collection system. For example, instead of discharging yellow grease to POTWs, food service establishments often accumulate this material for pick up by consolidation service companies for re-sale or re-use in the manufacture of tallow, animal feed supplements, fuels, or other products.

Additionally, food service establishments can install interceptor/collector devices (e.g., grease traps) in order to accumulate FOG on-site and prevent it from entering the POTW collection system. In many cases, an establishment that implements best management practices will realize financial benefit through a reduction in their required grease interceptor and trap maintenance frequency.

Likewise, more and more POTWs are addressing FOG discharges by imposing mandatory measures of various types, including inspections, periodic grease pumping, stiff penalties, and even criminal citations for violators, along with 'strong waste' monthly surcharges added to restaurant sewer bills.

Pretreatment programs are developing and using inspection checklists for both food service establishments and POTW pretreatment inspectors to control FOG discharges. Additionally, EPA identified typical numeric local limits controlling oil and grease in the range of 50 mg/L to 450 mg/L with 100 mg/L as the most commonly reported numeric pretreatment limit.

With this information in mind, it is apparent that while there has been some progress in collecting and disposing of FOG, much more needs to be done. In particular, there is a need for low-impact collection and disposal apparatuses and methods that rely on natural, biodegradable materials requiring low energy consumption usable in a wide variety of applications and at low cost. Implementation of FOG mitigation measures will have a corresponding benefit on sludge application on farmland since FOG has little or no benefit as a nutrient for plants and crops.

SUMMARY

Accordingly, the invention of this application employs a specially-designed container, such as but not limited to an absorbent tube or mat into which FOG can be introduced for collection, transport and disposal. In one example, an elongate tube or absorbent mat geotextile is used to contain sphagnum peat, mushroom compost materials, orange peels, or an absorbent polymeric material and to maximize contact surface area with the FOG materials in, for example, a grease trap. The sphagnum peat, mushroom compost, and orange peels are obtained from select locations in the United States or Canada known for this type of specialized product. Selected varieties of sphagnum peat and/or mushroom compost are observed to create a slight charge on the surface of the sphagnum peat and/or mushroom compost particles that draw the FOG from the surface water in the grease trap down to several inches below the surface. As used in this application, peat, mushroom and similar materials into which the FOG is absorbed are referred to generally and broadly as "capture materials" or absorbent materials. In certain aspects, it is contemplated that orange peels may be used as a capture or absorbent material. Likewise, the absorbent material may be a polymeric material such as a polyolefinic material and more preferably a polypropylene having oleophilic and hydrophobic properties that are ideal to absorb fat, oil, and/or grease. In certain aspects, the absorbent material is an oleophilic and hydrophobic material/matrix configured to absorb fats, oils, and/or greases while repelling and/or filtering out water from, for example, a mixture of water, fats, oils, and greases Products suitable for use in the FOG tube described in this application are "Dry All" wood fiber and Sphagnum peat moss processed and sold by Integrity Absorbent Products. In particular, the peat moss product is an all organic hydrocarbon absorbent, manufactured from large fiber sphagnum peat moss. The manufacturing process produces a product, which becomes both oleophilic, absorbing hydrocarbons and hydrophobic, i.e., repelling water. Due to its fibrous structure and processing, peat absorbs hydrocarbons quickly on contact by virtue of its wicking capillary action and encapsulates oil on contact. This makes peat ideal for hydrocarbon cleanup both on open water and land applications. Peat absorbs, on average, eight times its weight. This volume will vary based on the hydrocarbon being absorbed and the temperature. In certain aspects, orange peels have the same oleophilic and hydrophobic characteristics as those mentioned above.

In certain aspects, the grease absorbent material is oleophilic and hydrophobic material/matrix configured to absorb fats, oils, and/or greases while repelling and/or filtering out water from, for example, a mixture of water, fats, oils, and greases. According to another aspect of the invention, the fat, oil and/or grease absorbent capture material is selected from the group consisting of an organic material such as sphagnum peat, mushroom compost, and orange peels. According to another aspect of the invention, the fat, oil and/or grease capture material is selected from an absorbent porous, polymeric material that is preferably oleophilic and hydrophobic. In this aspect, the absorbent porous, polymeric material is a polyolefinic material and more preferably a polypropylene having oleophilic and hydrophobic properties that are ideal to absorb fat, oil, and/or grease.

According to another aspect of the invention, the fat, oil and/or grease is present in a range of between 88-75 percent and the capture material is present in a range of between 12 and 25 percent.

This type of natural cleansing and separation is one of the unique features of this invention and why it is useful to restaurants, industrial facilities and car repair shops that struggle with the maintenance of grease traps and oil spills. Once trapped in the tube or mat, the product can be easily and compactly shipped to a location for disposal, incineration or further processing, including processing the materials for use as fuel.

In recent years, the EPA and many large water and sewer districts have realized that application of sewage sludge and FOG materials on farm land is not a good fertilizer and has unintended long term consequences. Sewage Sludge Incineration (SSI) is becoming a safe and effective alternative around densely populated municipalities where land application of sewage sludge is less desirable. One of the benefits of the sphagnum peat FOG absorbent tubes and mats is that they comprise a high BTU fuel that can be used to increase the efficiency of SSI processes. In addition to providing a better and more efficient way for collecting and disposal of FOG, the product can separate the higher density grease and oil so that it can be disposed of in a landfill, and/or burned as fuel in a sludge incinerator.

The separation and reduction of volume in the partially emulsified liquid FOG material at the source in the grease trap will reduce the amount of liquid FOG that is land applied and/or causes problems with the sludge management at the wastewater plant.

Moreover, it is another object of the invention to provide an improved apparatus and method for collection and disposal of fats, oil and greases. In addition, the invention includes guidelines on where to place the FOG elongate tube or absorbent mat so that it maximizes collection of FOG, and follows local, state and Federal guidelines for grease traps and other interceptor and separation devices.

It is another object of the invention to provide an improved apparatus and method for collection and disposal of fats, oil and grease that provide enhanced environmental remediation.

It is another object of the invention to provide an improved apparatus and method for collection and disposal of fats, oil and grease that provides for the ability to utilize natural, renewable, biodegradable materials in the collection and disposal process.

It is another object of the invention to provide an improved apparatus and method for collection and disposal of fats, oil and grease that provides for the ability to separate the higher density grease and oil so that it can be disposed in a landfill, and/or burned as fuel in a sludge incinerator.

It is another object of the invention to utilize containers, such as tubes, mats and other configurations of this material to capture spills of oil and other hydrocarbons at vehicle repair facilities.

According to one aspect of the invention, an apparatus for collection and disposal of fats, oil and grease is provided that includes an elongate fabric tube having at least one open end, a biogradable material capable of absorbing a large quantity of fats, oil and grease positioned in the tube through the open end. The tube and the contained biogradable material is adapted for being placed in a source of fat, oil and/or grease for absorbing the fat, oil and/or grease into the biodegradable material for removal from the source and for transport to a location for processing. The tube preferably includes a closure for closing the open end of the tube with the biodegradable material positioned within the tube.

According to another aspect of the invention, an apparatus is provided for collection and disposal of fats, oil and grease and includes a container formed of a fabric having a multiplicity of openings and at least one open end. The container is adapted to receive an absorbent material into the container capable of absorbing a quantity of fats, oil and grease, the container and biogradable material adapted for being placed in a source of fat, oil and/or grease for absorbing the fat, oil and/or grease for removal from the source and for transport to a location for processing. A closure is provided for closing the open end of the container with the biodegradable material positioned within the container.

According to another aspect of the invention, the fabric is a geotextile.

According to another aspect of the invention, the fabric is a biodegradable material According to another aspect of the invention, the fabric is constructed of a biodegradable yarn selected from the group consisting of cotton, hemp, ramie or jute.

According to another aspect of the invention, the fabric is constructed of a synthetic yarn.

According to another aspect of the invention, the fabric has an apparent opening size (AOS) of 0.25 mm to 0.5 mm. In this aspect, the AOS of the container is smaller than the size(s) of the absorbent material positioned therein such that the absorbent material remains within the container until being released/removed from the container.

According to another aspect of the invention, the container is a tube.

According to another aspect of the invention, the tube includes one closed end and an open end adapted for being closed after being filled with the absorbent material.

According to another aspect of the invention, the tube includes an element adapted for receiving an elongate cord for allowing the tube to be lowered into and raised out of a source of FOG and to be tethered proximate the source of FOG.

According to another aspect of the invention, the fat, oil and/or grease absorbent material is selected from the group consisting of sphagnum peat, mushroom compost, orange peels, and polypropylene. In certain aspects, each of these absorbent materials are oleophilic and hydrophobic and are configured to absorb fats, oils, and/or greases while repelling and/or filtering out water from, for example, a mixture of water, fats, oils, and greases.

According to another aspect of the invention, the container is a three dimensional mat. The three dimensional mat preferably includes one or more planar surfaces. For example, in certain aspects, the mat includes a planar upper surface, a planar lower surface, and planar side surfaces. In certain additional aspects, the three dimensional mat is comprised of the absorbent material disclosed herein.

According to another aspect of the invention, the mat includes one closed end and an open end adapted for being closed after being filled with the absorbent material.

According to another aspect of the invention, the mat includes an element adapted for attaching an elongate cord to the mat for allowing the mat to be lowered into and raised out of a source of fat, oil and/or grease and to be tethered proximate the source of fat, oil and/or grease.

According to another aspect of the invention, the fat, oil and/or grease absorbent material is selected from the group consisting of sphagnum peat and mushroom compost.

According to another aspect of the invention, a method of capturing and disposing of fat, oil and/or grease is provided and includes the steps of providing a container formed of a fabric having a multiplicity of openings and at least one open end, positioning in the container an absorbent material capable of absorbing a quantity of fat, oil and grease, placing the container and biogradable material contained therein in a source of fat, oil and/or grease for absorbing the fat, oil and/or grease, removing the container of absorbent material and absorbed fat, oil and/or grease from the source of fat, oil and/or grease, and transporting the removed container to a location for processing.

According to another aspect of the invention, the method includes the step of incinerating the container, the absorbed material and absorbed fat, oil and/or grease.

According to another aspect of the invention, the step of providing a container includes the step of providing a tube adapted to receive the absorbent material.

According to another aspect of the invention, the step of providing a container includes the step of providing a mat adapted to receive the absorbent material.

According to another aspect of the invention, the method includes the step of tethering the container proximate the source of fat, oil and/or grease.

According to another aspect of the invention, the method includes the step of providing a closure for closing the open end of the container with the biodegradable material positioned within the container.

In additional aspects, the FOG absorbent material may be used alone (i.e., excluding the previously mentioned container that contains the absorbent material and/or the absorbent material separated from the container) to absorb FOG when forming/producing the biofuel product (i.e., the absorbent material having FOG absorbed therein). When used in this manner, a user (e.g., technician) places a desired, predetermined amount of absorbent material within, for example, a grease trap (or other container having FOG therein). The user then allows an adequate time for the absorbent material to absorb and preferably become saturated with FOG thereby forming the biofuel product. Subsequently the user removes the biofuel product from, for example, the grease trap for subsequent use and/or processing steps to be used as the biofuel product. During the removal step of the biofuel product (i.e., absorbent material having FOG absorbed therein) in the above mentioned process, it is further envisioned that a positive pressure pump (e.g., a modified pool pump such as the Pentair line of pool pumps) and other removal aids will be used to further expedite the overall process to remove the biofuel from the grease trap in an expeditious and efficient manner.

In the above mentioned method, the technician arrives at the grease trap to be serviced and removes the grease trap's lid. Next, the amount of absorbent material to be introduced into the grease trap will be determined by the technician visually inspecting and assessing the overall volume of the grease trap along with the ratio of FOG to brown water contained therein. The technician next introduces a sufficient amount of the loose absorbent material (e.g., 1 pound, 5 pounds, 10 pounds, 20 pounds, etc.—termed the "first amount" or "initial amount") into the trap to allow for the desirable amount of absorption of FOG into the absorbent material. In preferable aspects, the desirable amount of FOG absorption into the absorbent material is 5%, 10%, 20%, 30%, 40%, 50%, 60%, 70%, 80%, 90%, 95%, 98%, or 100% of the FOG within the grease trap.

After a predetermined time period in which absorption of FOG into the absorbent material has occurred, the grease trap is again visually inspected and assessed to further determine whether any FOG remains, and if so, to further determine the ratio of FOG to brown water remaining in the grease trap. At that time, more absorbent material (a "second amount" of absorbent material) may be added to absorb the remaining FOG (i.e., FOG that was not absorbed by the previously provided absorbent material). Subsequent amounts of absorbent material (e.g., "third amount", "fourth amount", "fifth amount", etc.) may be added by the technician until the desirable amount of FOG absorption (and desired FOG to brown water ratio) has been reached. After reaching the desired FOG absorption amount in the absorbent material (and the desired FOG to brown water ratio), the absorbent material having FOG absorbed therein (biofuel) may be subsequently removed all at once by the removal step; process discussed further below.

As an alternative to the above, an absorbing step followed by an immediate removal step may be used. In this aspect, the absorbent material (i.e., first amount or initial amount) is added to the grease trap and after a predetermined time period FOG is absorbed into the absorbent material forming the biofuel. Next, the biofuel (i.e., first amount of absorbent material having FOG absorbed therein) is removed from the grease trap. After removal of the absorbent material having FOG absorbed therein (i.e., biofuel) from the grease trap, the technician may again visually inspect and assess the grease trap to determine whether any additional FOG remains therein. If so, the technician may again, introduce the absorbent material ("second amount" of absorbent material) and allow for absorption of FOG into the second amount of absorbent material (biofuel). Subsequently, the second amount of absorbent material having FOG absorbed therein is removed from the grease trap. The above mentioned steps (i.e., absorbing FOG by the absorbent material followed by an immediate removing step until a desirable FOG to brown water ratio and/or FOG absorption amount in the absorbent material has been reached) may be repeated as desired by the technician.

To further aid in the removing/removal steps (i.e., removing the biofuel comprising the absorbent material having FOG absorbed therein), additional removal tools and aids may be used. For example, the technician may use a rake or rake-like device to actuate the absorbent material, FOG, and/or brown water in the grease trap and to spread the absorbent material more evenly on the surface of the FOG/water mixture within the grease trap. This step advantageously increases the rate of absorption into the absorbent material and further expedites the FOG capture and removal process from the grease trap. During this step, the absorbent material having FOG absorbed therein is hydrophobic and will continue to float even when saturated with FOG.

At this point, the technician may further utilize a positive pressure pump (a modified pool pump such as the Pentair line of pool pumps) to pump the biofuel (i.e., FOG laden absorbent material) from the top, or uppermost, portion of the grease trap and to remove the biofuel therefrom via a filter and/or physically removal (e.g., via a net or another similar removal device). During the removal process and while using the pump, the pump will beneficially circulate the brown water back into the grease trap thereby keeping the grease trap maximally efficient and effective. The maximum efficiency of the grease trap is achieved by keeping the grease trap full of water during the removal process.

While pumping the FOG. laden absorbent material out of the grease trap, the technician moves the end of the hose around the top and/or uppermost sections of the grease trap surface until all of the biofuel (i.e., absorbent material having FOG absorbed therein) has been removed from the grease trap.

After the biofuel (i.e., absorbent material laden with FOG and/or absorbent material having FOG absorbed therein) has been captured and removed from the grease trap and the unencumbered water drained from the positive pressure pump hoses into the grease trap, the grease trap lid is closed securely. Then the technician either transports the biofuel to another location, or leaves the biofuel in a secure area for subsequent removal and processing.

In certain aspects, the method of forming a biofuel by capturing fats, oil and % or grease in a grease trap are disclosed. In view of the above disclosures, this method may include comprising the steps of: (a) adding an absorbent material to the grease trap that has a mixture of water, fats, oil, and grease therein; the absorbent material comprising a hydrophobic and oleophilic material configured to absorb between two to eight times its weight of fats, oil, and/or grease; (b) forming a biofuel by absorbing over a predetermined period of time fats, oil, and/or grease within the absorbent material such that the absorbed fats, oil, and/or grease within the absorbent material are separated from the water within the grease trap; (c) removing the biofuel from the grease trap while the separated water of step (b) remains in the grease trap; and (d) optionally transporting the biofuel to a secure location for storage and/or incineration. In certain aspects, step (d) is included in the above method. Within the above method, the absorbent material is loose, contained within a container comprising a tube adapted to receive and securely hold the absorbent material therein, or formed as a mat. Within the above method, the absorbent material consists of at least one of sphagnum peat, mushroom compost, orange peels, and polypropylene. Within the above method, the absorbent material is configured to absorb between four to eight times its weight of the fats, oil, and/or grease. Within the above method, before step (a) the volume of a grease trap and fats, oil, and/or grease relative to the water therein are visually assessed to determine an amount of absorbent material to be added to the grease trap. In certain aspects, the above method further includes after step (c), repeating steps (a)-(c) until a desired amount of fats, oils, and/or grease has been absorbed and removed from the grease trap or until all fats, oils, and/or grease. In certain aspects, the above method further includes after step (b), repeating steps (a) and (b) until a desired amount of fats, oils, and/or grease has been absorbed by the absorbent material in the grease trap or until all fats, oils, and/or grease has been absorbed by the absorbent material. In certain aspects, the above method further includes pumping air by a positive pressure pump into the mixture of water, fats, oil, and grease to increase absorption, coagulation, and/or flocculation of the absorbent material during steps (a) and (b) and to aid and facilitate removing the biofuel from the grease trap during step (c) by maintaining the biofuel on an uppermost surface of the separated water that remains in the grease trap.

DETAILED DESCRIPTION OF THE PREFERRED EMBODIMENTS

Figure 1:
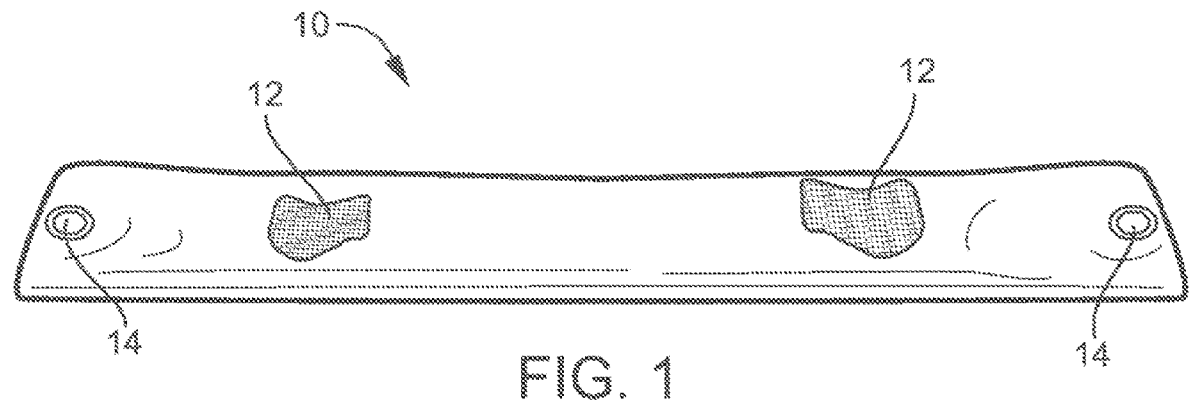
FIG. 1 is a perspective view of the geotextile container in tube form according to an embodiment of the invention.
Figure 2:
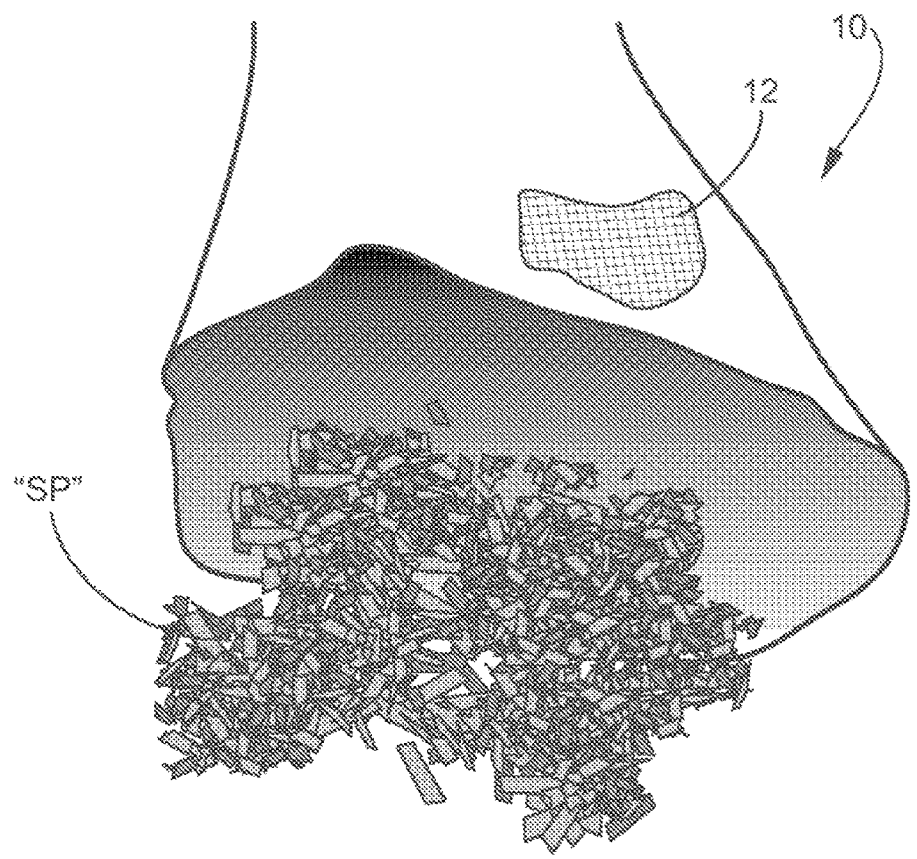
FIG. 2 is a fragmentary, enlarged end view of the tube of FIG. 1, shown in an open positon for receiving a quantity of sphagnum peat material, mushroom compost, orange peels, polypropylene or other absorbent material.

Referring now to the drawings, a container in the form of a tube 10 for use in the present invention is shown in the FIGS. 1-2, as noted. The tube 10 may be constructed according to many suitable constructions, but one construction comprises an elongate tube 10 that is formed of a geotextile fabric 12 that may be constructed by circular knitting, flat knitting, weaving, non-woven formation or any other fabric construction having a multitude of openings through the thickness of the fabric 12. The fabric 12 is preferably seamed along its length to form the tube 10. The tube 10 may be constructed of a synthetic, biodegradable or natural material. The fabric 12 of the tube 10 may be constructed of any suitable natural or biodegradable/synthetic yarn, for example, with a natural fiber such as cotton, hemp, ramie, jute or similar material because of its biodegradable characteristics, with apparent opening size (AOS) on the order of 0.25 to 0.5 mm depending on the size of the sphagnum peat or mushroom compost absorbent material. The empty tube 10 may be any suitable length and diameter, for example, 60 cm to 120 cm long and 7 cm to 15 cm in diameter depending on the size of the grease trap and the FOG loading from the restaurant or auto repair facility. As manufactured, the tube 10 is preferably closed at one end and filled from the opposite, open end. The open end of the filled tube 10 may be closed with any suitable closure, such as stitching, clips or tied off with cord at the top of the grease trap or other FOG separating and collection structure.

Figure 5:
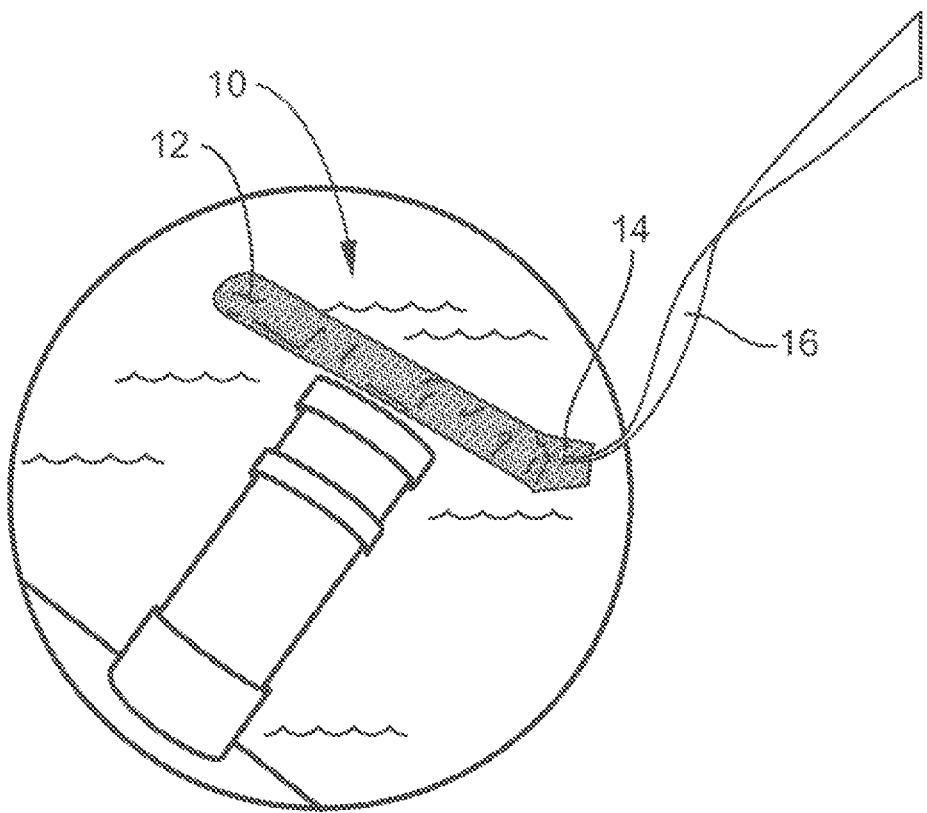
FIG. 5 is an illustration of a typical restaurant grease trap showing placement and use of the geotextile tube to absorb FOG.

The tube 10 may include an opening 14 on either or both ends to receive a cord 16, as shown in FIG. 5, by which the tube 10 may be lowered into and retrieved from a grease trap or other enclosure and tethered to the grease trap or other structure while in use.

One or more coatings may be applied to the fabric 12 to prevent penetration of the fabric 12 surface by water or aqueous salts thereby allowing the fabric 12 substrate to be non-absorbent for water or soluble salts.

Figure 3:
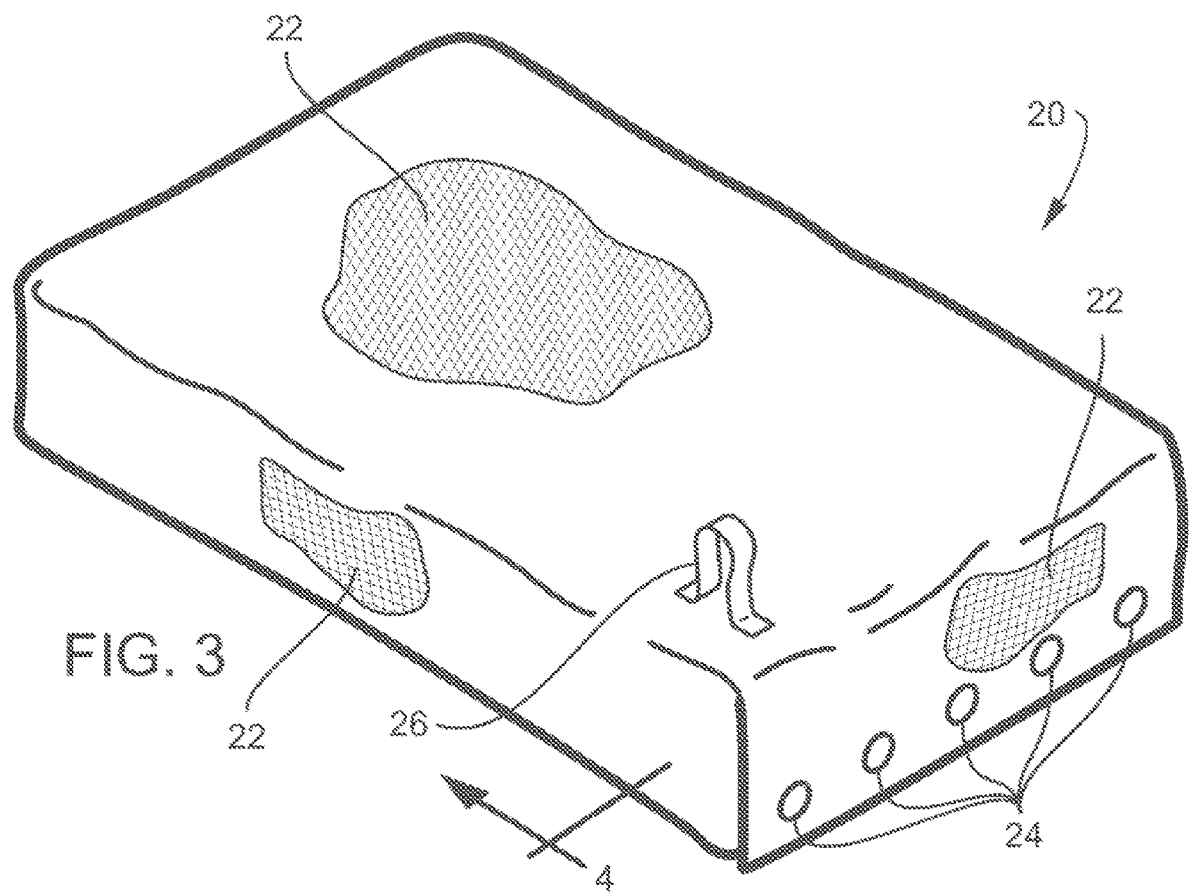
FIG. 3 is a perspective view of a geotextile container in mat form according to an embodiment of the invention.
Figure 4:
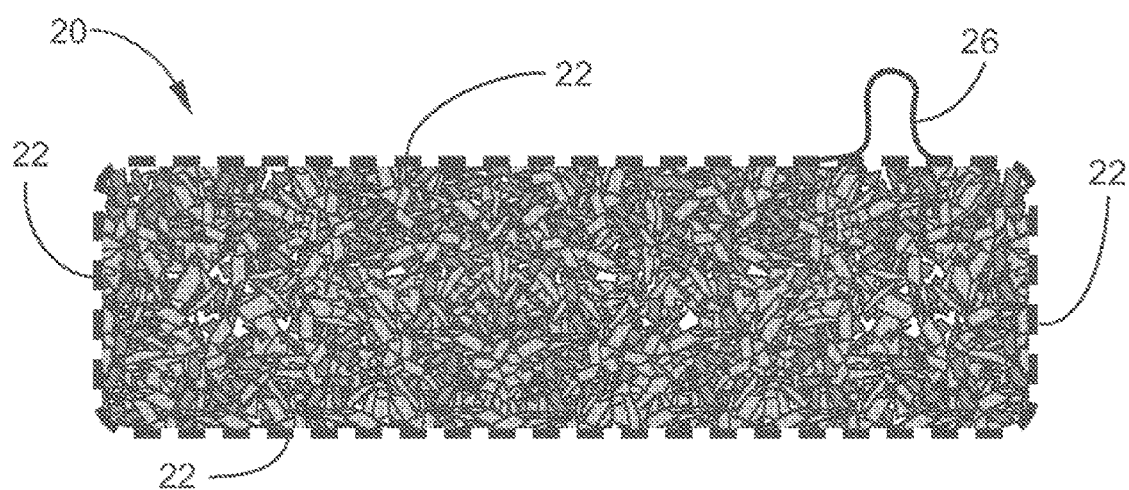
FIG. 4 is a vertical cross-section of the geotextile mat with sphagnum peat material or other absorbent material contained in the mat.

Referring now to FIGS. 3 and 4, a container in the form of a mat 20 for use in the present invention is shown in the FIGS. 3-4, as noted. The mat 20 may be constructed according to many suitable constructions, but one construction comprises a rectangular "box" shape that is formed of a geotextile fabric 22 that may be constructed by circular knitting, flat knitting, weaving, non-woven formation or any other fabric construction having a multitude of openings through the thickness of the fabric 22. The fabric 22 is preferably seamed along its length and width to form the mat 20. The mat 20 may be constructed of a synthetic, biodegradable or natural material. The fabric 22 of the mat 20 may be constructed of any suitable natural or biodegradable/synthetic yarn, for example, a natural fiber such as cotton, hemp, ramie, jute or similar material because of its biodegradable characteristics, with apparent opening size (AOS) on the order of 0.25 to 0.5 mm depending on the size of the sphagnum peat or mushroom compost absorbent material. The empty mat 20 may be any suitable length, width and height, for example, 60 cm to 120 cm long, 30 cm to 60 cm long and 10 cm to 20 cm in height depending on the size of the grease trap and the FOG loading from the restaurant or auto repair facility. As manufactured, the mat 20 is preferably closed at one end and filled from the opposite, open end. The open end of the filled mat 20 may be closed with any suitable closure, such as stitching, clips, or snaps 24. The mat 20 may be seamed in such manner as to create individual compartments within the mat 20.

The mat 20 may include a loop 26 to receive a cord by which the mat 20 may be lowered into and retrieved from a grease trap or other enclosure and tethered to the grease trap or other structure while in use.

One or more coatings may be applied to the fabric 22 to prevent penetration of the fabric 22 surface by water or aqueous salts thereby allowing the fabric 22 substrate to be non-absorbent for water or soluble salts.

The preferable FOG absorbent material filled into the mat 20 is a specialized form of sphagnum peat "SP" or mushroom compost materials.

FIG. 5 illustrates placement of a tube 10 proximate an entrance to a grease trap, and tethering the tube 10 with the cord 16 as described above to remain proximate to the grease trap entrance.

Figure 6:
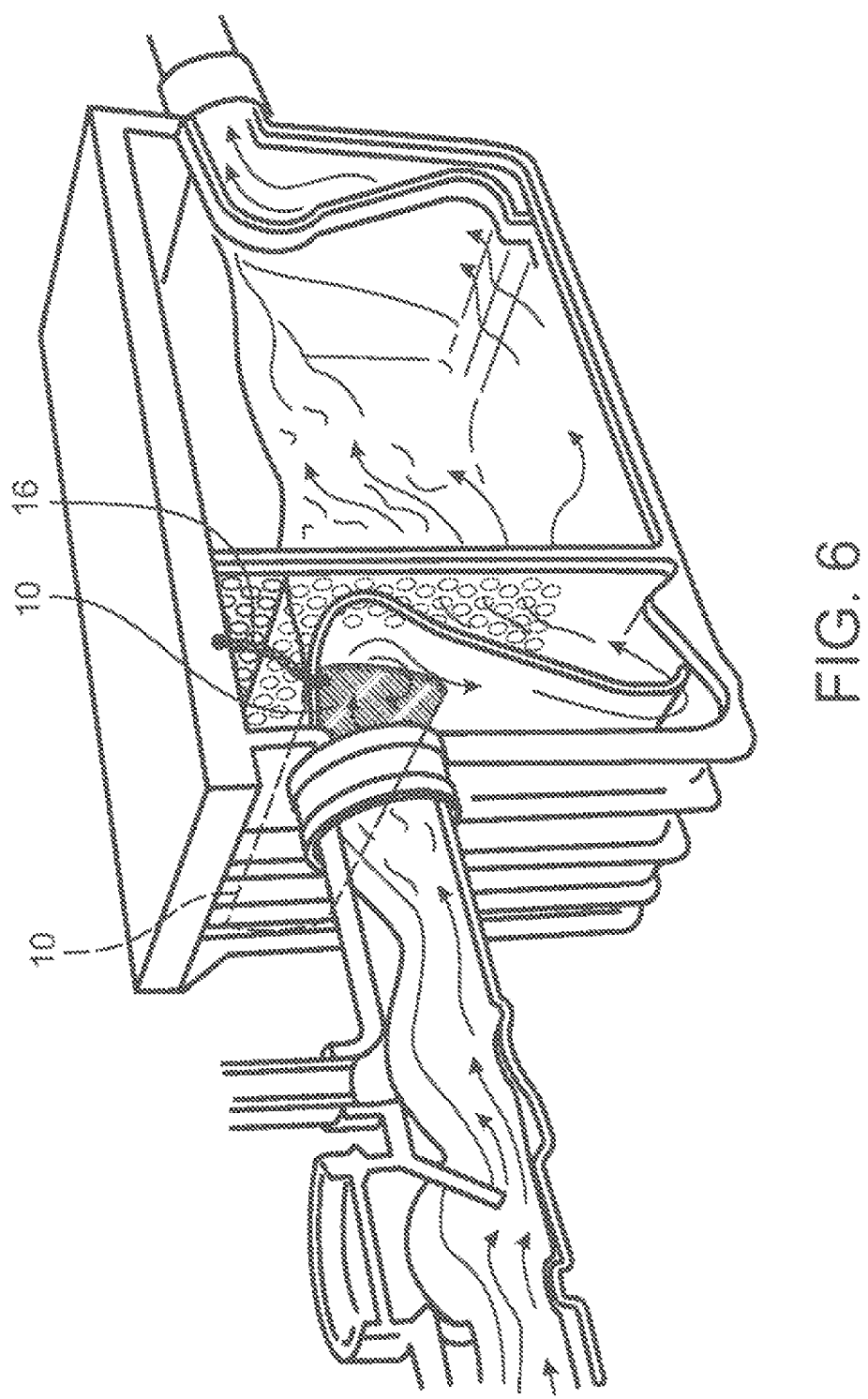
FIG. 6 is a cross-sectional view that shows the location of the absorbent mat in a cross section of a typical grease trap at a restaurant or auto maintenance facility.

FIG. 6 illustrates placement of the tube 10 in a grease trap relative to other components of a conventional grease trap structure.

The following step by step process is expected for typical use and implementation of the FOG product and collection process. The process is explained with reference to the tube 10, but will be essentially the same when using the mat 20.

STEP 1: Introduce the tube 10 with selected sphagnum peat "SP" or mushroom compost into the grease trap or other FOG collection structure. Tether the tube 10 with cord 16 so that it stays at the influent end of the grease trap, and is the optimal location of FOG collection. Prior to placement in the grease trap, weigh the dry tube 10 so that a "before and after" measure of FOG collection can be established.

STEP 2: After consultation with local water and sewer regulatory officials and the owner of the FOG collection device or grease trap, setup of a regular interval to remove and replace the FOG collection absorbent tube 10. From past experience, the best way to initiate the use of the FOG remediation technology is to start off as a regulatory approved Demonstration Project where the approach and results are measured and evaluated.

STEP 3: Depending on the interval for removal and collection of the FOG absorbent tube 10, arrange for storage in covered and secured FOG containers to avoid attracting small animals and rodents that are common in and around restaurants and auto repair facilities.

STEP 4: Transport and dispose of the FOG absorbent tube 10, mat 20 or other suitable container to a regulated, Subtitle D lined disposal facility, or to a sewage sludge incinerator (SSI). If disposed of at an SSI facility, the FOG tube 10 is then part of waste to energy, renewable energy fuel source.

The advantage of the FOG process using the tube 10 or mat 20 is that it safely and cost effectively separates FOG in the grease trap before it is mixed with large volumes of water and emulsified waste liquids. Separation after the fact is difficult and expensive.

The FOG absorbent tube 10 works for FOG collection because the sphagnum peat "SP" or mushroom compost materials are highly absorbent natural materials that separate the FOG from liquids or water. The absorbing characteristics are a combination of increased surface area and natural filtering processes, similar to that provided by charcoal or activated carbon. A slightly larger AOS in the filtering geotextile fabric 12 will allow more of the natural absorbing and geochemical attraction between the sphagnum peat "SP" to have better contact with the surface FOG materials to attract and collect it from the liquids/water. This approach reduces the tendency or emulsification of the FOG into the grease trap so that frequency of the grease trap pumping and remixing of the FOG and water/liquid will be reduced. Collecting the FOG from the surface of the grease trap is much more efficient and cost effective.

Collecting the FOG from the surface of grease traps substantially reduces the volume of mixed FOG and liquids that are the cause of significant maintenance problems in sewer systems, and the cause of difficult to apply sludge materials that are typically utilized on farmland. FOG offer little or no benefit for improving macro and micro nutrients on farmland because it is resistant to biodegradation and has little or no nitrogen, phosphorus, and potassium (i.e. PKN). See Use of Peat in the Treatment of Oily Waters, G. N. Mathavan & T. Viraraghavan, 1989 Estimate of the absorbing qualities of peat moss appear to be the range of 5 to 10 kg/m$^2$ per FOG tube 10 per week. This will be an area of applied research and measurement during future demonstration projects.

Polar molecules have a positive charge on one end and a negative charge on the other end. Non-polar molecules do not have two electrical poles and the electrons are distributed symmetrically on both sides. FOG is composed of organic non-polar compounds. Water is a polar solvent. Only polar compounds or other polar solvents will mix with water. Therefore, non-polar FOG will not readily mix with water. Depending on the source, FOG has a density of approximately 0.863-0.926 g:cm$^3$. Water has a density of approximately 1.000 g/cm$^3$. The lesser density will float on top of the greater density substance if it does not mix, thus non-polar FOG floats on water because it does not mix and gravity exerts more pull on the greater density water molecules. Water molecules are relatively small because they are only composed of one oxygen and two hydrogen molecules ($H_2O$). They therefore pack closely together in a space. Molecules of oil are large and have complicated shapes, thus requiring more space than water molecules. This is why oil is less dense than water.

A few oils having densities less than water are known to be polar compounds and can mix with water and therefore not float on the water's surface.

Thus, polarity and density both contribute to oil floating on water.

Polarity is a relative term. On a sliding scale, some oils are more or less polar than others are and have both polar and non-polar attributions Also, the heating of oils and interaction with other organic compounds it is exposed to during heating, can change the oil's chemical composition, and thus change the relative polarity.

The above referenced principles permit the method of this application to work as intended and as developed.

Further evidence supporting the "charge" principle is found at Fats, Oil and Grease Science, Dothan, Ala. Fats, Oils, and Grease (FOG) Science https://www.dothan.org/DocumentCenter/View/3032/FOG---Science?bidId=

Figure 7:
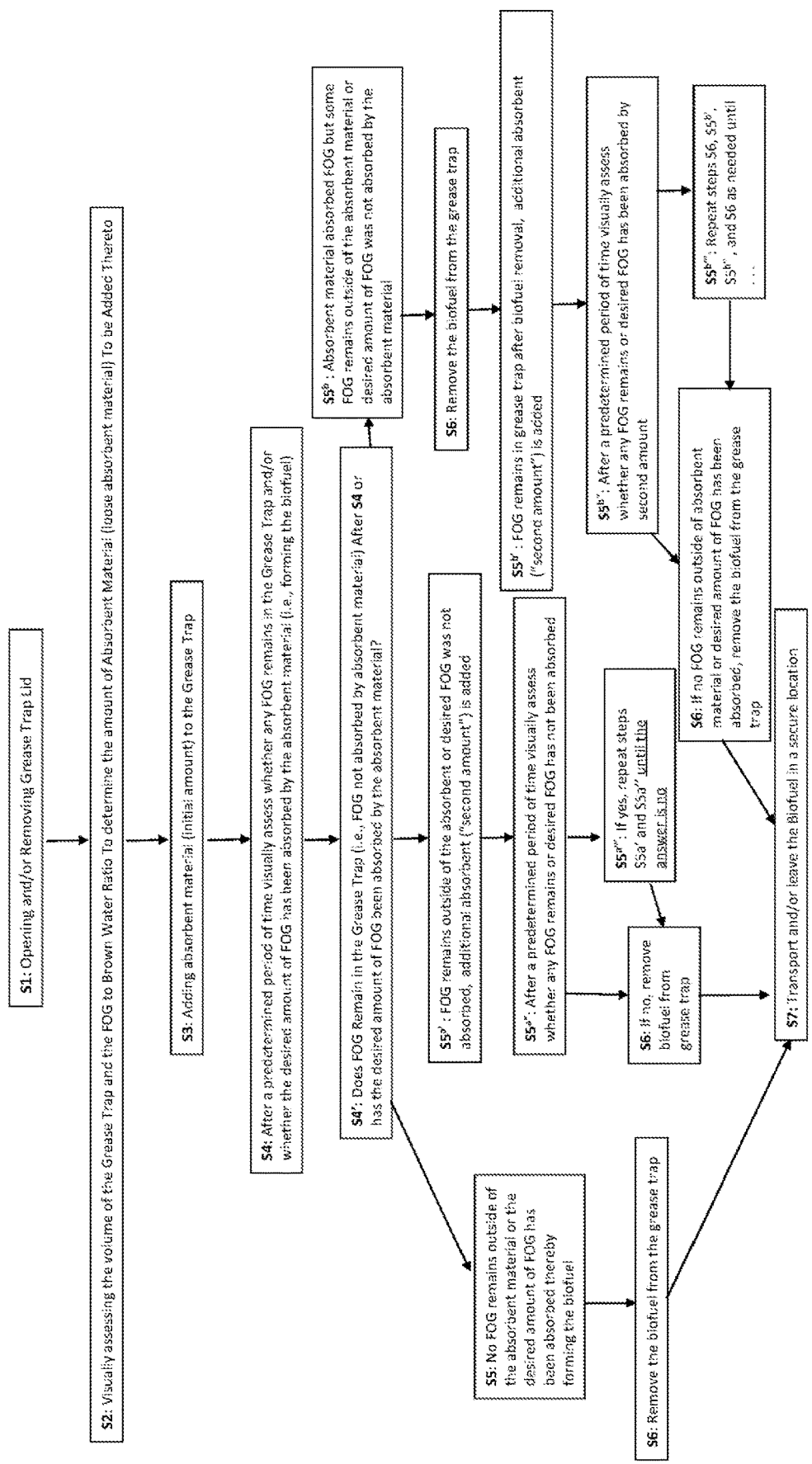
FIG. 7 schematically depicts an alternative method of the biofuel formation/production and removal from, for example, a grease trap using the disclosed absorbent material(s).

As further shown in FIG. 7 and in additional aspects, the FOG absorbent material may be used alone (i.e., excluding the previously mentioned container that contains the absorbent material and/or the absorbent material separated from the container) to absorb FOG when forming/producing the biofuel product (i.e., the absorbent material having FOG absorbed therein). When used in this manner, a user (e.g., technician) places a desired, predetermined amount of absorbent material within, for example, a grease trap (or other container having FOG therein). The user then allows an adequate time for the absorbent material to absorb and preferably become saturated with FOG thereby forming the biofuel product. Subsequently the user removes the biofuel product from, for example, the grease trap for subsequent use and/or processing steps to be used as the biofuel product. During the removal step of the biofuel product (i.e., absorbent material having FOG absorbed therein) in the above mentioned process, it is further envisioned that a positive pressure pump (e.g., a modified pool pump such as the Pentair line of pool pumps) and other removal aids (e.g., a net, filter, etc.) will be used to further expedite the overall process to remove the biofuel from the grease trap in an expeditious and efficient manner.

More specifically in the above-mentioned method and in view of FIG. 7, the technician arrives at the grease trap to be serviced and removes/opens the grease trap's lid (S1). Next, the amount of absorbent material to be introduced into the grease trap will be determined by the technician visually inspecting and assessing the overall volume of the grease trap along with the ratio of FOG to brown water contained therein (S2). The technician next introduces a sufficient amount of the loose absorbent material (e.g., 1 pound, 5 pounds, 10 pounds, 20 pounds, etc. termed the "first amount" or "initial amount") into the trap (S3) to allow for the desirable amount of absorption of FOG into the absorbent material. For example, each pound of absorbent material should absorb between 5 pounds to 9 pounds of FOG per pound of absorbent material, and in preferred aspects, each pound of absorbent material should absorb between 7 pounds to 8 pounds of FOG per pound of absorbent material. In preferable aspects, the desirable amount of FOG absorption of FOG into the absorbent material is 5%, 10%, 20%, 30%, 40%, 50%, 60%, 70%, 80%, 90%, 95%, 98%, or 100% of the FOG within the grease trap, and in certain aspects the percentage removal of FOG complies with local laws and ordinances, state laws and ordinances as well as any applicable Federal laws.

After a predetermined time period in which absorption of FOG into the absorbent material has occurred (S4), the grease trap is again visually inspected and assessed to further determine whether any FOG remains (S4'), and if so, to further determine the ratio of FOG to brown water remaining in the grease trap. At that time, more absorbent material (a "second amount" of absorbent material) may be added (S5$^{a'}$) to absorb the remaining FOG (i.e., FOG that was not absorbed by the previously provided absorbent material in (S3)). After a predetermined time period (S5$^{a''}$), the technician again visually assesses whether any FOG remains in the grease trap (outside of the biofuel) or whether the desired amount of FOG has not been absorbed. If the answer to (S5$^{a''}$) is no, the biofuel is removed from the grease trap (S6) by the removal process discussed further below and subsequently stored (S7).

However, if the answer to (S5$^{a''}$) is yes, subsequent amounts of absorbent material (e.g., "third amount", "fourth amount", "fifth amount", etc.) may be added (S5$^{a'''}$), by the technician until the desirable amount of FOG absorption (and desired FOG to brown water ratio) has been reached. After reaching the desired FOG absorption amount in the absorbent material (and the desired FOG to brown water ratio), the absorbent material having FOG absorbed therein (biofuel) may be subsequently removed (S6) all at once by the removal step/process discussed further below.

As an alternative to the above, an absorbing step followed by an immediate removal step may be used. In this aspect, the absorbent material (S3) (i.e., first amount or initial amount) is added to the grease trap and after a predetermined time period (S4) FOG is absorbed into the absorbent material forming the biofuel. If no FOG remains outside of the absorbent material or the desired amount of FOG has been absorbed thereby forming the biofuel (S5), the biofuel (S6) (i.e., first amount of absorbent material having FOG absorbed therein) is removed from the grease trap and the process is concluded by subsequently storing (S7) the biofuel.

However, in certain alternative aspects and after steps (S4) and (S4'), it may be determined that the absorbent material has absorbed FOG but some FOG remains outside of the absorbent material or the desired amount of FOG was not absorbed (S5$^b$) by the absorbent material. (S6) removal of the absorbent material having FOG absorbed therein (i.e., biofuel) from the grease trap may immediately occur after (S5$^b$), and the technician may again visually inspect and assess the grease trap to determine whether any additional FOG remains therein. If so, the technician may again, introduce (S5$^{b'}$) the absorbent material ("second amount" of absorbent material) and allow for absorption of FOG into the second amount of absorbent material (biofuel) (S5$^{b''}$). If no FOG remains outside of absorbent material or desired amount of FOG has been absorbed, the biofuel is removed from the grease trap (S6). However, after (S5$^{b-}$) if FOG remains outside of absorbent material or desired amount of FOG has not been absorbed, (S5b''') occurs in which (S6), (S5$^{b'}$), (S5$^{b''}$), and (S6) are repeated until no FOG remains outside of the absorbent material or the desired amount of FOG has been absorbed (e.g., almost all FOG has been absorbed), the biofuel from the grease trap and subsequently store (S7).

To further aid in the removing/removal steps (i.e., removing the biofuel comprising the absorbent material having FOG absorbed therein), additional removal tools and aids may be used. For example, the technician may use a rake or rake-like device to actuate the absorbent material, FOG, and/or brown water in the grease trap and to spread the absorbent material more evenly on the surface of the FOG/water mixture within the grease trap. This step advantageously increases the rate of absorption into the absorbent material and further expedites the FOG capture and removal process from the grease trap. During this step, the absorbent material having FOG absorbed therein is hydrophobic and will continue to float even when saturated with FOG.

At this point, the technician may further utilize a positive pressure pump (a modified pool pump such as the Pentair line of pool pumps) to pump the biofuel (i.e., FOG laden absorbent material) from the top, or uppermost, portion of the grease trap and to remove the biofuel therefrom via a filter and/or physically removal (e.g., via a net or another similar removal device). During the removal process and while using the pump, the pump will beneficially circulate the brown water back into the grease trap thereby keeping the grease trap maximally efficient and effective. The maximum efficiency of the grease trap is achieved by keeping the grease trap full of water during the removal process.

While pumping the FOG. laden absorbent material out of the grease trap, the technician moves the end of the hose around the top and/or uppermost sections of the grease trap surface until all of the biofuel (i.e., absorbent material having FOG absorbed therein) has been removed from the grease trap.

After the biofuel (i.e., absorbent material laden with FOG and/or absorbent material having FOG absorbed therein) has been captured and removed from the grease trap and the unencumbered water drained from the positive pressure pump hoses into the grease trap, the grease trap lid is closed securely. Then the technician either transports the biofuel to another location, or leaves the biofuel in a secure area for subsequent removal and processing.

An apparatus and method for collection and disposal of fats, oil and grease according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A method of forming a biofuel by capturing fats, oil and/or grease in a grease trap, comprising the steps of:
   a adding an absorbent material to the grease trap that has a mixture of water, fats, oil, and grease therein; the absorbent material comprising a hydrophobic and oleophilic material configured to absorb between two to eight times its weight of fats, oil, and/or grease, wherein the absorbent material is contained within a container formed of a fabric having a multiplicity of openings, the container is configured to receive and securely hold the absorbent material therein;
   b. forming a biofuel by absorbing, over a predetermined period of time, fats, oil, and/or grease within the absorbent material such that the absorbed fats, oil, and/or grease within the absorbent material are separated from the water within the grease trap; and
   c. removing the biofuel from the grease trap while the separated water of step (b) remains in the grease trap;
   wherein:
   the fabric is constructed of a biodegradable geotextile,
   the multiplicity of openings having an apparent opening size (AOS) of 0.25 mm to 0.5 mm,
   the fat, oil, and/or grease present in the biofuel ranges between 88 and 75 percent total weight of the biofuel and the absorbent material present in the range of between 12 and 25 percent total weight of the biofuel product.

2. The method of claim 1, wherein the absorbent material is loose, contained within a container comprising a tube adapted to receive and securely hold the absorbent material therein, or formed as a mat.

3. The method of claim 1, wherein the absorbent material consists of at least one of sphagnum peat, mushroom compost, orange peels, and polypropylene.

4. The method of claim 1, wherein the absorbent material is configured to absorb between four to eight times its weight of the fats, oil, and/or grease.

5. The method of claim 1, wherein before step (a) the volume of a grease trap and fats, oil, and/or grease relative to the water therein are visually assessed to determine an amount of absorbent material to be added to the grease trap.

6. The method of claim 1, further comprising after step (c), repeating steps (a)-(c) until a desired amount of fats, oils, and/or grease has been absorbed and removed from the grease trap or until all fats, oils, and/or grease.

7. The method of claim 1, further comprising after step (b), repeating steps (a) and (b) until a desired amount of fats, oils, and/or grease has been absorbed by the absorbent material in the grease trap or until all fats, oils, and or grease has been absorbed by the absorbent material.

8. The method of claim 1, further comprising pumping air by a positive pressure pump into the mixture of water, fats, oil, and grease to increase absorption, coagulation, and/or flocculation of the absorbent material during steps (a) and (b) and to aid and facilitate removing the biofuel from the grease trap during step (c) by maintaining the biofuel on an uppermost surface of the separated water that remains in the grease trap.

9. The method of claim 1, further comprising incinerating the biofuel.

10. The method of claim 1, further comprising transporting the biofuel away from the grease trap.

11. The method of claim 1, wherein the fabric is a geotextile.

12. The method of claim 1, wherein the fabric is a biodegradable material.

13. The method of claim 12, wherein the biodegradable material comprises cotton, hemp, ramie, or jute.

14. The method of claim 12, wherein the absorbent material consists of at least one of sphagnum peat, mushroom compost, orange peels, and polypropylene.

15. The method of claim 12, wherein the absorbent material is sphagnum peat.

16. The method of claim 1, wherein the absorbent material is sphagnum peat.

17. The method of claim 1, wherein before step (a) the volume of the grease trap and fats, oil, and/or grease relative to the water therein are visually assessed to determine an amount of absorbent material to be added to the grease trap.

18. The method of claim 1, further comprising after step (c), repeating steps (a)-(c) until a desired amount of fats, oils, and/or grease has been absorbed and removed from the grease trap or until all fats, oils, and/or grease.

19. The method of claim 1, further comprising after step (b), repeating steps (a) and (b) until a desired amount of fats, oils, and/or grease has been absorbed by the absorbent material in the grease trap or until all fats, oils, and/or grease has been absorbed by the absorbent material.

20. The method of claim 1, further comprising applying positive pressure using a positive pressure pump into the mixture of water, fats, oil, and grease to increase absorption, coagulation, and/or flocculation of the absorbent material during steps (a) and (b) and to aid and facilitate removing the biofuel from the grease trap during step (c) by maintaining the biofuel on an uppermost surface of the separated water that remains in the grease trap.

21. The method of claim 1, further comprising adding loose absorbent material to the grease trap either before, during, or after step (a).

\* \* \* \* \*